(12) United States Patent
Aoki

(10) Patent No.: US 10,956,100 B2
(45) Date of Patent: Mar. 23, 2021

(54) PRINT SERVICE MANAGEMENT APPARATUS, PRINT SERVICE SYSTEM, AND NON-TRANSITORY COMPUTER READABLE MEDIUM FOR ADDRESSING POSSIBILITY OF FRAUDULENT USE OF PRINT SERVICE

(71) Applicant: FUJI XEROX CO., LTD., Tokyo (JP)

(72) Inventor: Masanori Aoki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 186 days.

(21) Appl. No.: 15/996,012

(22) Filed: Jun. 1, 2018

(65) Prior Publication Data
US 2018/0364955 A1 Dec. 20, 2018

(30) Foreign Application Priority Data

Jun. 16, 2017 (JP) .............................. JP2017-118294

(51) Int. Cl.
*G06F 3/12* (2006.01)
(52) U.S. Cl.
CPC .......... *G06F 3/1222* (2013.01); *G06F 3/1203* (2013.01); *G06F 3/1231* (2013.01); *G06F 3/1238* (2013.01); *G06F 3/1286* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 2004/0239974 A1* | 12/2004 | Uchida | ................. G06F 3/1205 358/1.14 |
| 2013/0091002 A1* | 4/2013 | Christie | ................. G06Q 30/02 705/14.26 |

FOREIGN PATENT DOCUMENTS

| | | |
|---|---|---|
| JP | 2001-094590 A | 4/2001 |
| JP | 2005-267002 A | 9/2005 |
| JP | 2010-136141 A | 6/2010 |
| JP | 2011-022737 A | 2/2011 |

* cited by examiner

*Primary Examiner* — Andrew H Lam
(74) *Attorney, Agent, or Firm* — Oliff PLC

(57) ABSTRACT

A print service management apparatus includes: a file receiving unit that receives a file to be registered sent from an information processing device; a management unit that registers the file received by the file receiving unit in a memory unit and manages the file; and a registration control unit that, when there is a possibility of fraudulent use of print service using the file received by the file receiving unit, controls registration so that a higher load than normal is imposed on a file registration operation by a user of the information processing device.

16 Claims, 11 Drawing Sheets

FIG. 4

| NO | CATEGORY | KEYWORD | RETRIEVAL CONDITION |
|---|---|---|---|
| 1 | CONTRACT FRAUD | SIGNATURE | AND1 |
| 2 | CONTRACT FRAUD | SEAL | AND1 |
| 3 | CONTRACT FRAUD | CONTRACT | AND2 |
| 4 | CONTRACT FRAUD | COVENANT | AND2 |
| 5 | CONTRACT FRAUD | CONCLUSION | AND2 |
| 6 | BANK TRANSFER FRAUD | ACCOUNT FOR TRANSFER | AND1 |
| 7 | BANK TRANSFER FRAUD | ACCOUNT NUMBER | AND2 |
| 8 | BANK TRANSFER FRAUD | AMOUNT OF MONEY | AND3 |
| 9 | BANK TRANSFER FRAUD | DEPOSIT | AND3 |
| 10 | THREAT | AMOUNT OF MONEY | AND1 |
| 11 | THREAT | DEADLINE | AND2 |
| ⋮ | | | |

FIG. 6

FILE TO BE REGISTERED MAY INCLUDE CRITICAL INFORMATION.
PLEASE INPUT YOUR INFORMATION.

NAME :

CONTACT INFORMATION :

PURPOSE OF USE :

NEXT    CANCEL

FIG. 7

| PRINT ID | FILE NAME | SIZE | SHEET | TYPE | USER INFORMATION NUMBER | DISABLEMENT | DATE OF DISABLEMENT |
|---|---|---|---|---|---|---|---|
| prtID001 | XX INSURANCE CONTRACT.pdf | 123 KB | A3 | PDF | UserInfo-001 | 0 | |
| prtID002 | img-00001.jpg | 4.5 MB | L | JPG | | 0 | |
| prtID003 | MONTHLY SUMMARY RESULT.xlsx | 789 KB | A4 | XLS | | 0 | |
| prtID004 | BROCHURE.xps | XXX | B4 | XPS | | 0 | |
| prtID005 | INDISTINGUISHABLE BY NAME.docx | XXX | B5 | DOC | UserInfo-002 | 1 | 2017/03/31 01:23 |
| prtID006 | NEW YEAR'S CARD ILLUSTRATION.jpg | XXX | POSTCARD | JPG | | 0 | |
| prtID007 | PRESENTATION MATERIAL.pptx | XXX | XXX | PPT | | 0 | |

FIG. 11

| COMPANY NAME | TERMINAL NAME | IP ADDRESS |
|---|---|---|
| P | P001 | 123.456.789.012 |
| | P003 | 123.456.789.321 |
| Q | Q120 | 456.789.012.963 |
| | Q222 | 456.789.012.852 |
| | Q411 | 456.789.123.741 |
| ⋮ | | |
| | | |

PRINT SERVICE MANAGEMENT APPARATUS, PRINT SERVICE SYSTEM, AND NON-TRANSITORY COMPUTER READABLE MEDIUM FOR ADDRESSING POSSIBILITY OF FRAUDULENT USE OF PRINT SERVICE

CROSS-REFERENCE TO RELATED APPLICATIONS

This application is based on and claims priority under 35 USC 119 from Japanese Patent Application No. 2017-118294 filed on Jun. 16, 2017.

BACKGROUND

Technical Field

The present invention relates to a print service management apparatus, a print service system, and a non-transitory computer readable medium.

SUMMARY

According to an aspect of the invention, there is provided a print service management apparatus including: a file receiving unit that receives a file to be registered sent from an information processing device; a management unit that registers the file received by the file receiving unit in a memory unit and manages the file; and a registration control unit that, when there is a possibility of fraudulent use of print service using the file received by the file receiving unit, controls registration so that a higher load than normal is imposed on a file registration operation by a user of the information processing device.

BRIEF DESCRIPTION OF THE DRAWINGS

Exemplary embodiments of the present invention will be described in detail based on the following figures, wherein:

FIG. 4 is a table illustrating an example of data structure of fraudulent use keyword information to be stored in a fraudulent use keyword information memory in the first exemplary embodiment;

FIG. 6 is a screen view illustrating an example of a user information input screen in the first exemplary embodiment;

FIG. 7 is a table illustrating an example of data structure of file management information to be stored in a file management information memory in the first exemplary embodiment;

FIG. 11 is a table illustrating an example of data structure of company information to be stored in a company information memory in the second exemplary embodiment.

DETAILED DESCRIPTION

Hereinafter, exemplary embodiments of the invention will be described with reference to the drawings.

First Exemplary Embodiment

Figure 1:
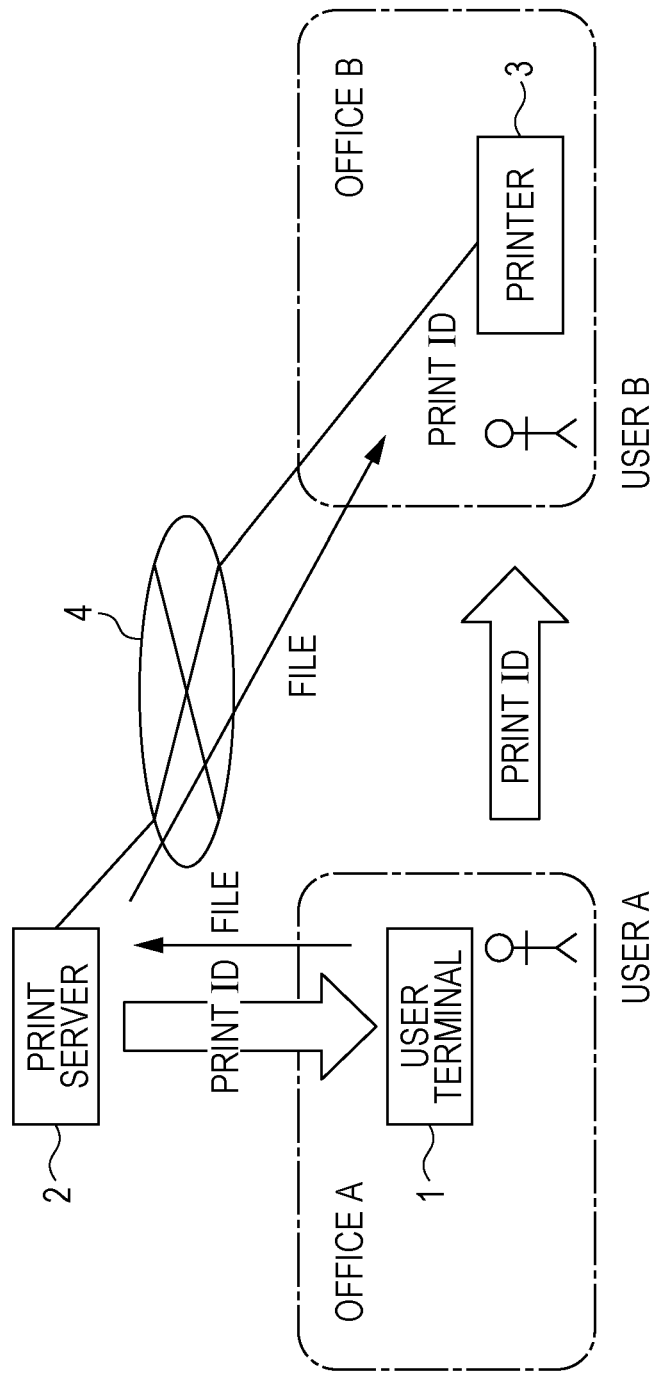
FIG. 1 is a schematic configuration diagram illustrating a print service system according to a first exemplary embodiment of the invention.

FIG. 1 is a schematic configuration diagram illustrating a first exemplary embodiment of a print service system according to the invention. FIG. 1 illustrates a user terminal 1, a print server 2 as a print service management apparatus, and a printer 3. The user terminal 1 is an information processing device such as a personal computer (PC) used by a user A in an office A. The printer 3 is installed in an office B of a user B, and is connected to the print server 2 via a network 4 to allow data communication.

Figure 2:
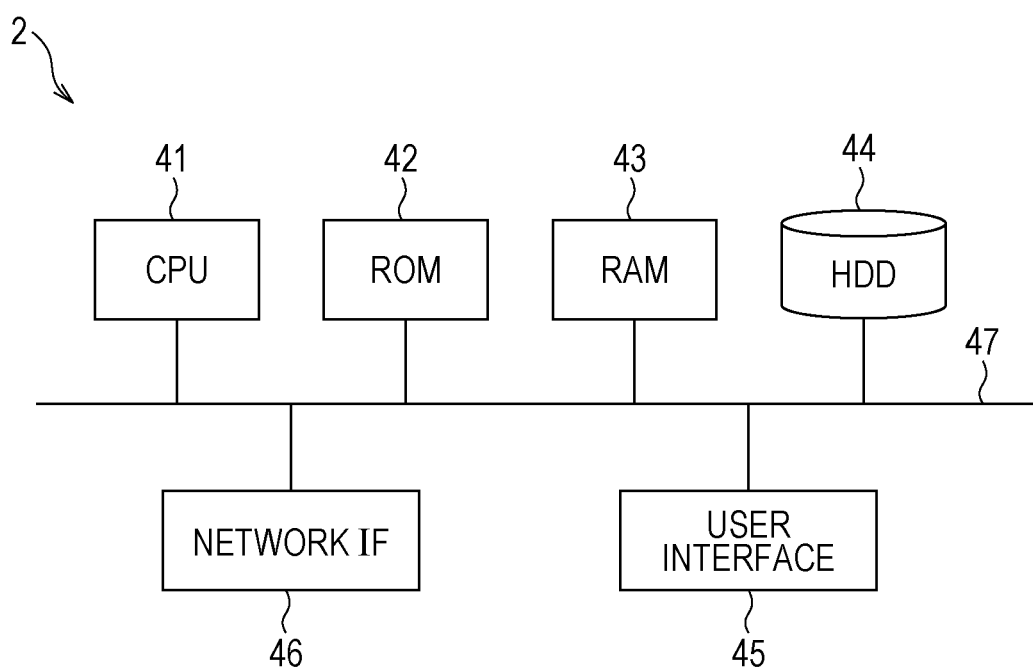
FIG. 2 is a hardware configuration diagram of a print server in the first exemplary embodiment.

FIG. 2 is a hardware configuration diagram of the print server 2 in this exemplary embodiment. The print server 2 in this exemplary embodiment can be achieved by a general-purpose hardware configuration in related art. Specifically, as illustrated in FIG. 2, the print server 2 is configured by a CPU 41, a ROM 42, a RAM 43, a hard disk drive (HDD) 44 as a memory unit, a user interface 45, and a network interface (IF) 46 provided as a communication unit which are connected to an internal bus 47. The user interface 45 is configured by, for instance, a mouse and a keyboard as serving an input unit, and a display serving as a display unit.

The user terminal 1 is also the same type of computer as the print server 2, thus the hardware configuration is shown as in FIG. 2. It is sufficient that the printer 3 be equipped with a printing function, however, in this exemplary embodiment, a function of receiving a print ID specified by input from a user is necessary. Thus, it is assumed that an image forming apparatus such as a multifunction machine having an operation panel is used.

Although multiple user terminals 1 and printers 3 may be provided, it is sufficient that both deliver the processing capability described below, thus one user terminal 1 and one printer 3 are illustrated for the sake of convenience in FIG. 1.

An overview of the flow of service processing provided by the print service system having the above configuration will be described below. When the user A registers a file in the print server 2, the print server 2 issues a print ID. The print server 2 holds and manages the print ID and the file in association with each other. The user A informs the user B of the issued print ID in some way. When the user B inputs the print ID to the printer 3, the printer 3 obtains a file corresponding to the inputted print ID from the print server 2, and prints the file.

Figure 3:
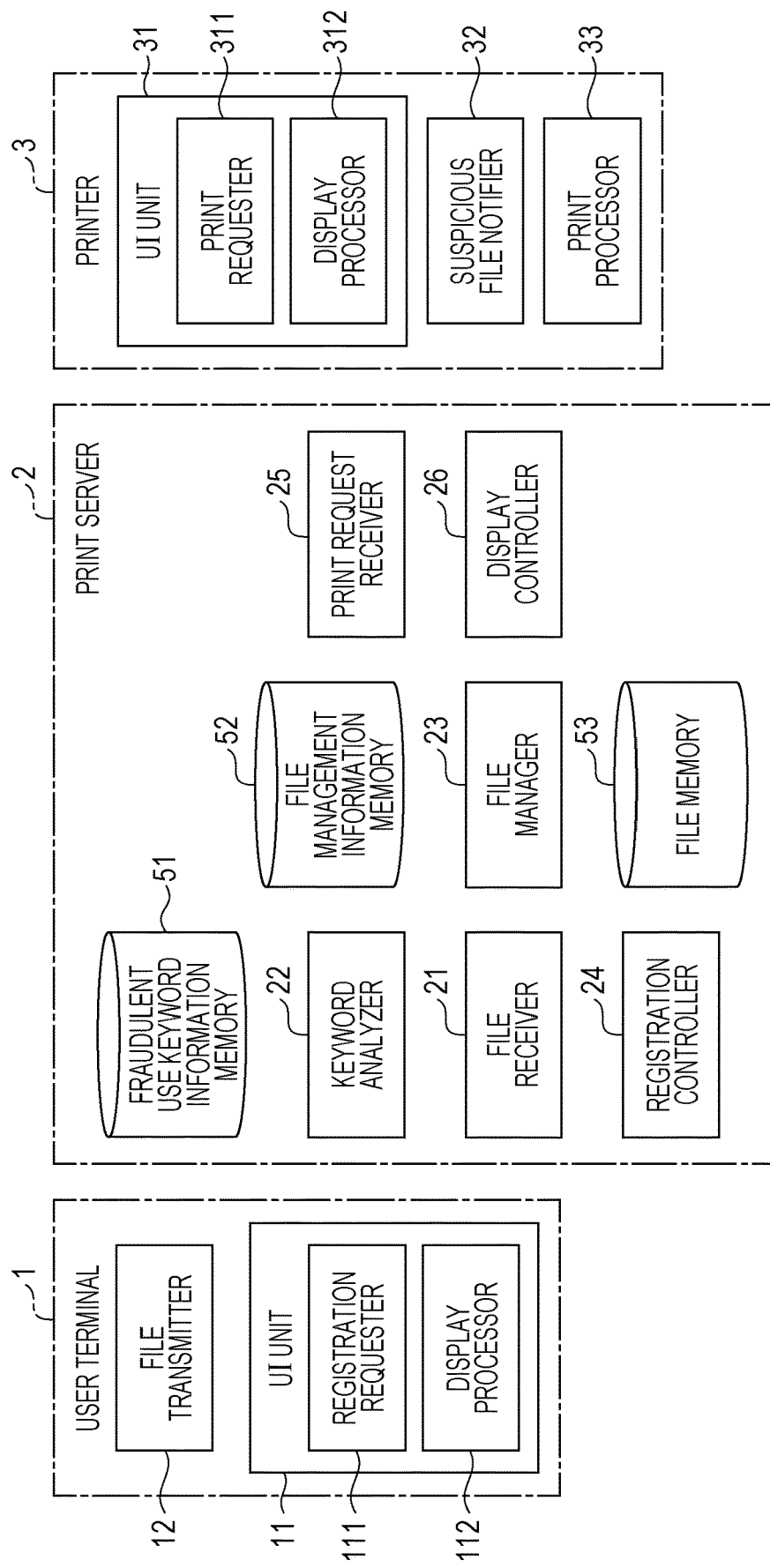
FIG. 3 is a diagram illustrating a block configuration of each of apparatuses included in the print service system in the first exemplary embodiment.

FIG. 3 is a diagram illustrating a block configuration of each of apparatuses included in the print service system illustrated in FIG. 1. It is to be noted that any component not used for description of this exemplary embodiment is omitted in FIG. 3.

The user terminal 1 has a user interface (UI) unit 11, and a file transmitter 12. The UI unit 11 is a unit that displays various screens and receives an input operation of a user via the various screens, and has a registration requester 111, and a display processor 112 in this exemplary embodiment. In response to an input operation of a user who wishes to register a file in the print server 2, the registration requester 111 requests registration of the file in the print server 2. In addition, the registration requester 111 obtains a print ID which is issued after a registration request is received, and stores the print ID in a predetermined region of the user terminal 1, or causes the display processor 112 to display a screen. The display processor 112 displays a screen which is utilized when a file is registered. The display processor 112 transmits the file to be registered to the print server 2.

The components 11, 12 in the user terminal 1 are implemented by a cooperative operation of a computer that serves as the user terminal 1, and a program that is executed by a CPU mounted on the computer. In the first exemplary embodiment, the program is assumed to a Web application provided from the print server 2. However, the program is not limited to a Web application.

The print server 2 has a file receiver 21, a keyword analyzer 22, a file manager 23, a registration controller 24, a print request receiver 25, a display controller 26, a fraudulent use keyword information memory 51, a file management information memory 52, and a file memory 53. The file receiver 21 receives a file to be registered, which is sent from the user terminal 1. In the fraudulent use keyword information memory 51, as described later in detail, one or multiple character strings (fraudulent use keywords), which may be written in a file for fraudulent use of print service, are registered. The keyword analyzer 22 analyzes whether or not a character string specified as a fraudulent use keyword is included in the file, and determines whether or not there is a possibility of fraudulent use of print service using the file. The file manager 23 serves as a management unit that registers a file received by the file receiver 21 in the file memory 53 and manages the file. In particular, in this exemplary embodiment, the file manager 23 controls permission of registration of a file, generation of file management information on the file, and file registration operation by a user in cooperation with the registration controller 24 according to a result of the analysis by the keyword analyzer 22.

The registration controller 24 serves as a registration control unit that, when there is a possibility of fraudulent use of print service using a file received by the file receiver 21, controls registration so that a higher load than normal is imposed on file registration operation by a user of the user terminal 1. The print request receiver 25 receives a print request sent from the printer 3. The display controller 26 performs display control over the operation panel of the printer 3. In particular, when a file to be printed specified in the print request received by the print request receiver 25 is managed in association with fraudulent use possibility information, the display controller 26 in this exemplary embodiment performs control to cause the printer 3 to display a message indicating that there is a possibility of fraudulent use of print service using the file.

FIG. 4 is a table illustrating an example of data structure of fraudulent use keyword information to be stored in a fraudulent use keyword information memory 51 in this exemplary embodiment. The "fraudulent use keyword" refers to a character string which may be written in a file for fraudulent use of print service. The fraudulent use keyword information is defined as a triple of a category indicating a purpose of fraudulent use, a keyword which may be fraudulently used in the category, and a retrieval condition. A serial number is assigned to each triple. A method of utilizing the fraudulent use keyword information will be described along with description of the operation.

The file memory 53 stores a file to be registered, which is transmitted from the user terminal 1. The file management information memory 52 stores file management information for managing the files registered in the file memory 53.

The components 21 to 26 in the print server 2 are implemented by a cooperative operation of a computer that serves as the print server 2, and a program that is executed by the CPU 41 mounted on the computer. The memories 51 to 53 are implemented in HDD 44 mounted on the print server 2. Alternatively, the RAM 43 or an external memory unit may be utilized via a network.

The printer 3 has a user interface (UI) unit 31, a suspicious file notifier 32, and a print processor 33. The UI unit 31 is a unit that displays various screens and receives an input operation of a user via the various screens, and has a print requester 311 and a display processor 312 in this exemplary embodiment. The print requester 311 transmits a print request including a print ID to the print server 2 according to a print instruction in which the print ID is specified by a user. The display processor 312 displays a screen which is utilized at the time of printing. When a user who is going to print a file determines that the file to be printed is suspicious, the suspicious file notifier 32 notifies the print server 2 of the determination. The print processor 33 performs print processing of a file obtained from the print server 2.

The components 31 to 33 in the printer 3 are implemented by a cooperative operation of a computer mounted on the printer 3, and a program that is executed by a CPU mounted on the computer. In the first exemplary embodiment, the program is assumed to be a Web application provided from the print server 2. However, the program is not limited to a Web application.

Also, the program used in this exemplary embodiment may be provided by a communication unit as well as by a computer readable recording medium, such as a USB memory, in which the program is stored. The program provided by a communication unit or a recording medium is installed in a computer, and various types of processing are achieved by the CPU of the computer that executes the program sequentially.

Next, the operation in this exemplary embodiment will be described. As described above, in order for a user to utilize the print service, a file has to be registered in the print server 2. First, the file registration processing will be described with reference to the flowchart illustrated in FIG. 5.

A user who wishes to utilize the print service starts a registration application by performing a predetermined operation via the user terminal 1. Thus, the registration requester 111 performs a registration operation under the control of the registration controller 24, thereby requesting registration of a file to the print server 2. At this point, the file transmitter 12 transmits the file to be registered to the print server 2.

The file receiver 21 in the print server 2 receives the file transmitted from the user terminal 1 (step S101). Subsequently, the keyword analyzer 22 analyzes whether or not a character string (keyword) or a combination of character strings for the purpose of fraudulent use is included in the received file (step S102). More specifically, the following analysis is performed.

The keyword analyzer 22 extracts a keyword from the fraudulent use keyword information memory 51 per category. Each keyword is associated with "ANDn" (n is a positive integer) as a retrieval condition, and keywords with the same retrieval condition are connected by "or", and keywords (group) with different retrieval conditions are connected by "and". For instance, "AND1" is set as the retrieval condition for "signature" and "seal", and "AND2" is set as the retrieval condition for "contract", "covenant", and "conclusion" out of the keywords belonging to the category of contract fraud. In this case, the following fraudulent use condition is formed: ("signature" or "seal") and ("contract" or "covenant" or "conclusion"). In other words, when a file includes at least one of keywords "signature", and "seal", and at least one of keywords "contract", "covenant", and "conclusion", the keyword analyzer 22 determines that there is a possibility of fraudulent use using the file. When the determination is negative, the keyword analyzer 22 similarly determines whether or not there is a possibility of fraudulent use for other categories.

When the keyword analyzer 22 determines that there is no possibility of fraudulent use for all categories, that is, when the file received by the file receiver 21 does not satisfy any fraudulent use condition (N in step S103), the file manager 23 causes the registration controller 24 to request a normal file registration operation in the same manner as before from a user, and proceeds to processing of issuing a new print ID.

On the other hand, when the keyword analyzer 22 determines that there is a possibility of fraudulent use for at least one of the categories, that is, when the file satisfies a fraudulent use condition (Y in step S103), the file manager 23 causes the registration controller 24 to perform control to impose a higher load than normal on the file registration operation by a user. The file registration operation on which a higher load than normal is imposed refers to a burdensome operation for a user who performs the registration operation.

For instance, an input screen for user information as illustrated in FIG. 6 is displayed on the user terminal 1, and a user is prompted to input user information although such input of user information is not originally required. In addition, input of 400 characters or more is required for a utilization purpose. Although input of three items is required in the example of an input screen of FIG. 6, for instance, input of many pieces of information, such as 30 items or more, may be required.

In this manner, when there is a possibility of fraudulent use using the file to be registered, the registration controller 24 controls registration so that a higher load than normal is imposed on the file registration operation of a user by requiring additional input of user information. A user who needs to register a file for business operations would continue to input user information till the end regardless of an increased load on the registration operation, however, a malicious user may give up registration of a file due to an increased load on the registration operation.

In this manner, the print server 2 receives user information inputted on the input screen (step S104), however, when a user does not input user information (N in step S105), the print server 2 discards the file received in step S101, and completes the registration processing (step S111).

When a user inputs user information (Y in step S105), the file manager 23 stores the inputted user information (step S106). In this exemplary embodiment, the user information is stored in the file management information memory 5 for the sake of convenience, however, a memory unit for storing the user information may be separately prepared.

Subsequently, in the same manner as in the case where it is determined that there is no possibility of fraudulent use using the file received by the file receiver 21, the file manager 23 issues a new print ID for the file as a reservation number for printing (step S107), and generates file management information then stores the information in the file management information memory 52 (step S108). The file manager 23 then registers the file in the file memory 53 (step S109), and notifies the user terminal 1 of the issued print ID (step S110).

FIG. 7 is a table illustrating an example of data structure of file management information to be stored in the file management information memory 52 in this exemplary embodiment. The file management information is generated for each issued print ID. Specifically, in the file management information, a file name, a size, a sheet, a type, a user information number, disablement, and date/time of disablement are set in association with an issued print ID. In the file name, the size, the sheet, and the type, a name, a size, a document size, and a file type of a registered file are set, respectively. These pieces of information are identifiable by analyzing the file. The following user information number is identification information to associate with the user information received in step S104. It is to be noted that the user information stored in step S106 is assigned an identification number (user information number) to identify the user information, and the identification number is set to the user information number. The disablement is flag information that indicates whether or not printing of the file is disabled by a user who is going to print the file, and "1" is set to a disabled file in this exemplary embodiment. As an initial value, "0", which indicates that a file is not disabled, is set to the disablement. A date/time, at which a file is disabled, is set to the date/time of disablement.

It is to be noted that in this exemplary embodiment, as an example of file registration operation on which a higher load than normal is imposed, input of user information, and input with an increased number of characters or an increased number of items have been described. However, without being limited to this, for instance, the number of operations for making transitions between screens may be increased by providing a greater number of screens for the registration operation. Alternatively, in order to reduce responsiveness, a response speed after an item value is inputted may be decreased. In this manner, a load may be imposed on a user by increasing the time taken for the registration operation.

In the file management information illustrated in FIG. 7, it is possible to determine whether or not there is a possibility of fraudulent use of print service using the file by whether or not user information number is set. In other words, although the user information number also serves as fraudulent use possibility information which indicates a possibility of fraudulent use of print service using the file, when inputted information is not stored like the user information, flag information may be managed as fraudulent use possibility information in association with the file.

It is to be noted that FIG. 4 illustrates a setting example of retrieval conditions in a combination of multiple keywords as the fraudulent use keyword information used for determination of a possibility of fraudulent use. However, without necessarily combining keywords, even when a file includes one keyword, it may be determined that there is a possibility of fraudulent use. In this exemplary embodiment, examples of a load imposed on the registration operation, such as input of user information, and an increased number of characters, have been exemplified. However, for instance, a load imposed on the registration operation may be associated with each category of fraudulent use, and a load associated with a category satisfying a fraudulent use condition in step S103 may be imposed on a user.

Although keywords are pre-set for each category in this exemplary embodiment, without pre-classifying the keywords into categories, a category, which is a purpose of fraudulent use of a file, may be identified based on, for instance, the frequency of appearance of each keyword included in the file, and it may be determined in step S103 that a fraudulent use condition is satisfied for only the identified category.

Figure 8:
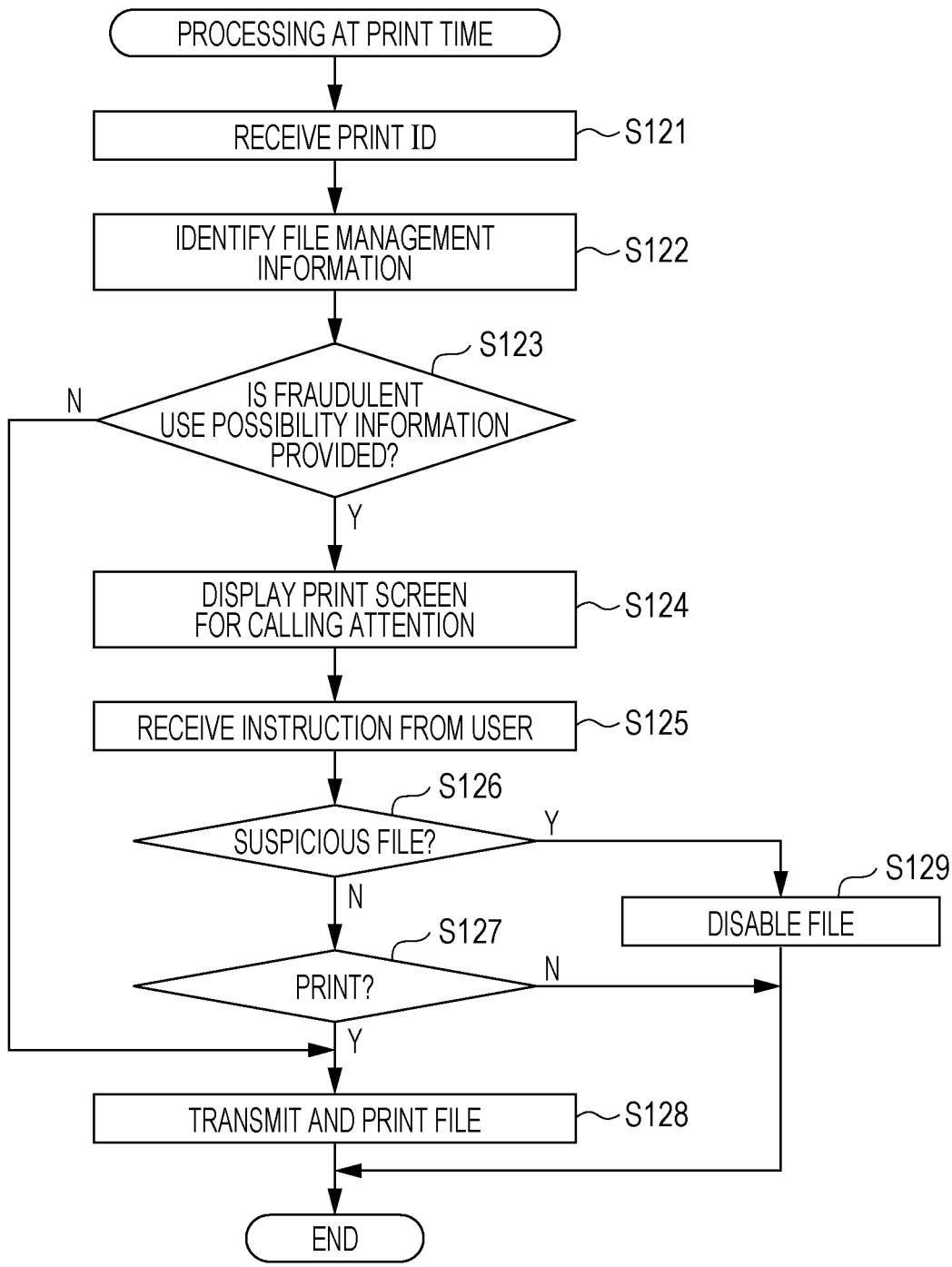
FIG. 8 is a flowchart illustrating the processing performed at the time of printing a file in the first exemplary embodiment.

When a file can be registered in the print server 2 in this manner, a file registrant of the file notifies a user who requests printing of a print ID issued from the print server 2. Hereinafter, the processing performed at the time of printing a file will be described with reference to the flowchart illustrated in FIG. 8.

A user (hereinafter referred to a "printing executor") who wishes to print a file starts up a printing application by performing a predetermined operation via the operation panel of the printer 3. When a print ID is inputted on a predetermined print screen by a printing executor, the print requester 311 requests printing to the print server 2 by transmitting a print ID. That is, the print requester 311 requests transmission of a file to be printed.

When the print request receiver 25 in the print server 2 receives a print ID transmitted from the printer 3 (step S121), the file manager 23 refers to the file management information memory 52, and identifies file management information corresponding to the received print ID (step S122). It is checked whether or not fraudulent use possibility information (user information number for file management information exemplified in FIG. 7) is set to the identified file management information. When a user information number is not set (N in step S123), the file manager 23 determines that there is no possibility of fraudulent use using the file, and the print request receiver 25 retrieves a file corresponding to the transmitted print ID from the file memory 53 in the same manner as before, then transmits the file to the printer 3, thereby causing the print processor 33 in the printer 3 to execute printing (step S128).

Figure 9:
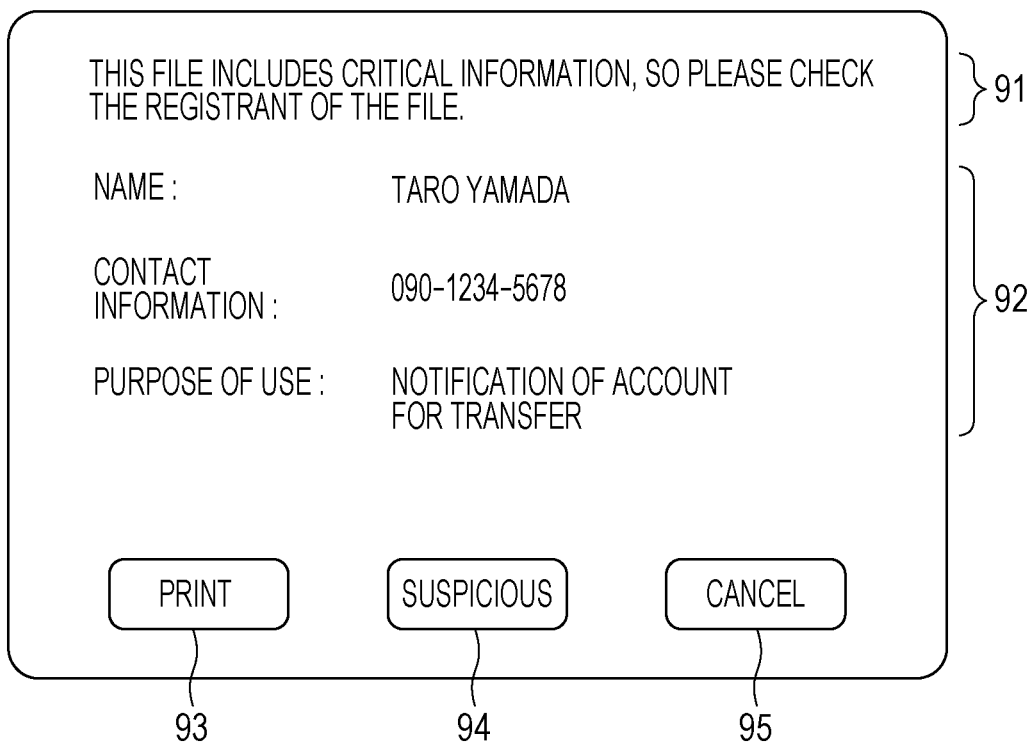
FIG. 9 is a screen view illustrating an example of a print screen in the first exemplary embodiment.

On the other hand, when fraudulent use possibility information is set to the identified file management information (Y in step S123), the display controller 26 causes the printer 3 to display a print screen for calling attention exemplified in FIG. 9 (step S124). The print screen includes a message 91 indicating that there is a possibility of fraudulent use of print service using the file, and the message 91 calls attention to the printing executor. In addition, when user information is used as fraudulent use possibility information, user information 92 is further displayed as a message. Thus, the printing executor can check a file registrant. Although there is no guarantee that a user (file registrant) who is going to fraudulently use print service inputs correct user information, it is possible to call attention to the printing executor at least.

The printing executor can select a print button 93, a suspicious button 94, or a cancel button 95 on the print screen. An operation of one of buttons 93 to 95 by the print executor gives an instruction for a file with a possibility of fraudulent use. The instruction by a user is sent to the print server 2, and the print request receiver 25 receives the instruction (step S125). When the instruction indicates print, that is, when the print executor selects the print button 93 (N in step S127, Y in step S126), the print request receiver 25 retrieves a file corresponding to the print ID from the file memory 53 in the same manner as before, then transmits the file to the printer 3, thereby causing the print processor 33 in the printer 3 to execute printing (step S128).

When the instruction indicates cancel, that is, when the print executor selects the cancel button 95 (N in step S127, N in step S126), printing is cancelled. In this case, the operation panel in the printer 3 returns to the initial screen, and nothing is performed in the print server 2.

Like this, when printing is desired to be avoided, the print executor only have to select the cancel button 95. However, when the print executor feels that the file is suspicious in consideration of the content of a message displayed on the screen, the print executor may select the suspicious button 94 rather than select the cancel button 95 just to avoid printing. Although the print executor should be familiar with the user information, if a registrant name is different or a utilization purpose notified by the registrant is different from a utilization purpose displayed on the screen, the print executor may feel that the file is suspicious.

When a user selects the suspicious button 94 (Y in step S126), the file manager 23 sets "1" to the disablement in corresponding file management information according to the operation instruction to disable the file, and sets the date/time of disablement (step S129). In this manner, in the file management information, information on the file, for which printing is disabled by the disablement is recorded. Once a file is disabled, then it is no longer possible to print the file by not only a user who has disabled the file, but also other users.

As described above, according to this exemplary embodiment, when there is a possibility of fraudulent use of print service, a higher load than normal is imposed on the file registration operation, and burden is thereby placed on the registrant, and occurrence of fraudulent use of print service can be reduced. Also, it is possible to call attention to the printing executor.

It is to be noted that in order to facilitate tracking of a user (file registrant) with a possibility of fraudulent use, when there is a possibility of fraudulent use of print service, information related to the file registrant may be additionally obtained.

For instance, when a photographing unit (camera) is mounted on the user terminal 1 and it is determined that there is a possibility of fraudulent use of print service, the registrant may be photographed by operating the photographing unit. In other words, imaging data may be obtained as the information related to the file registrant.

Alternatively, when a positioning unit (GPS) is mounted on the user terminal 1 and it is determined that there is a possibility of fraudulent use of print service, the position of the registrant may be obtained by operating the positioning unit. In other words, position information may be obtained as the information related to the file registrant.

Second Exemplary Embodiment

In the first exemplary embodiment, when there is a possibility of fraudulent use of print service with a file, a higher load than normal is imposed on the file registration operation by a user, and burden is thereby placed on the registrant. However, even if it seems that there is a possibility of fraudulent use of print service because a keyword which presumably indicates fraudulent use of print service is included in a file, when there is no possibility of fraudulent use of print service due to guaranteed identity of the registrant, it may be not necessary to impose a higher load than normal on the file registration operation.

Thus, in this exemplary embodiment, when the identity of the registrant is guaranteed, a file registration operation can be performed with a normal load.

Figure 10:
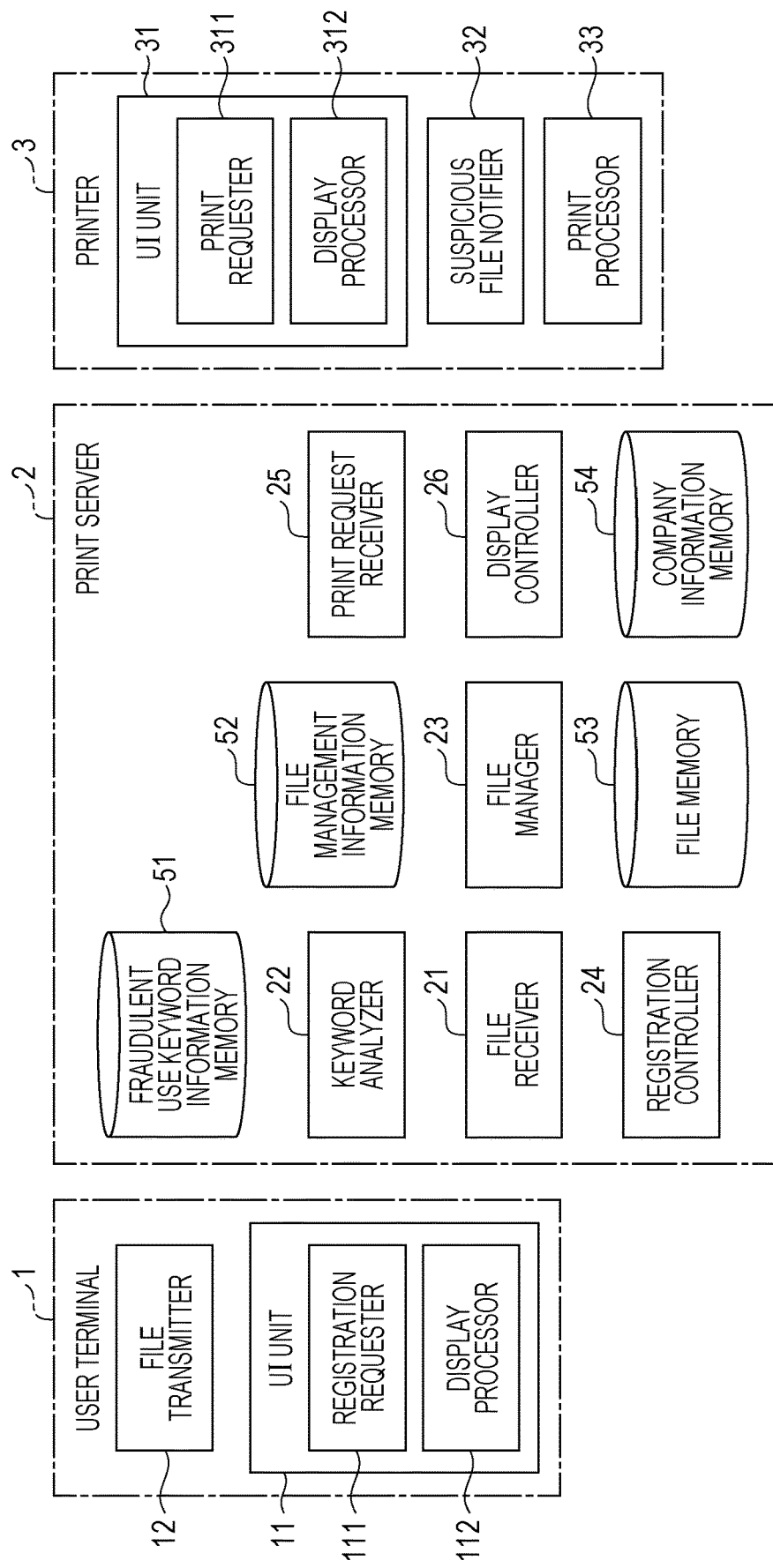
FIG. 10 is a diagram illustrating a block configuration of each of apparatuses included in a print service system in a second exemplary embodiment.

FIG. 10 is a diagram illustrating a block configuration of each of apparatuses included in the print service system in this exemplary embodiment. The same components as in the first exemplary embodiment are labeled with the same symbol, and a description is omitted. The print server 2 in this exemplary embodiment has a configuration in which a company information memory 54 is added to the configuration shown in the first exemplary embodiment.

FIG. 11 is a table illustrating an example of data structure of company information to be stored in the company information memory 54 in this exemplary embodiment. In the company information, a company name as the information that identifies a company is set in association with a terminal name used in the company, and the IP address of the terminal. In the company information, the user terminal 1 utilized for file registration is set by a reliable company for which it is guaranteed that print service is not fraudulently used due to a contract or the like. In other words, since the user terminal 1 presented by a reliable company, it is indirectly guaranteed that there is no possibility of fraudulent use of print service using the file registered via the user terminal 1.

Figure 5:
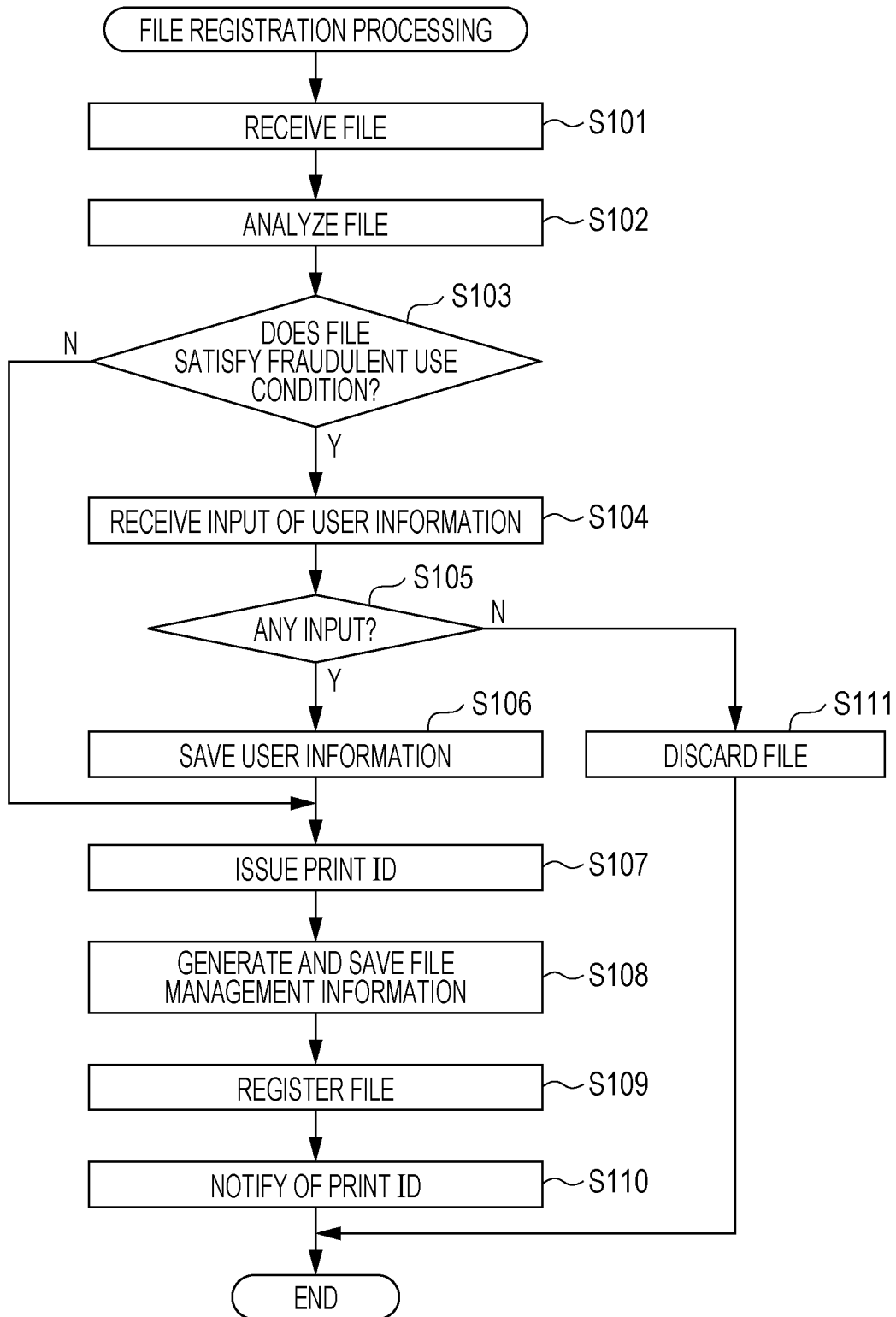
FIG. 5 is a flowchart illustrating file registration processing in the first exemplary embodiment.

Hereinafter, the file registration processing in this exemplary embodiment will be described, and basically is the same as in the first exemplary embodiment except that when a fraudulent use condition is satisfied, the following processing is added in step S103 in FIG. 5.

Specifically, when the file satisfies a fraudulent use condition (Y in step S103), the registration controller 24 checks the IP address of the user terminal 1, which is the transmission source of the file. The registration controller 24 then obtains company information from the company information memory 54, and when the IP address of the user terminal 1 is registered in the company information, the registration controller 24 proceeds to the processing of issuing a print ID without proceeding to the processing of inputting user information (step S107). When the IP address of the user terminal 1 serving as the transmission source of the file is not registered in the company information, similarly to the first exemplary embodiment, the registration controller 24 proceeds to the processing of inputting user information (step S104).

According to this exemplary embodiment, even when the file includes a keyword which presumably indicates fraudulent use of print service, when the identity of a registrant is guaranteed, it is possible to allow the registrant to perform a normal file registration operation.

The IP address of the user terminal 1, for which no fraudulent use is guaranteed, is presented by a company, thus in this exemplary embodiment, for the sake of management of information, the IP address is set and registered in the company information as guarantee information in association with the company. However, a company name is unnecessary for determination of the presence of guarantee, thus only the IP address may be set and registered. Also, in this exemplary embodiment, the presence of guarantee of no fraudulent use is determined by the IP address that identifies the user terminal 1, but may be determined by a user. Specifically, identification information (such as a user ID) of a user, for whom no fraudulent use is guaranteed, may be provided by a company, and may be set and registered in the company information as the guarantee information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print service management apparatus comprising:
a processor programmed to:
receive a file to be registered sent from an information processing device;
register the file received in a memory and manage the file; and
when there is a possibility of fraudulent use of print service using the file received,
control registration so that a higher load than normal is imposed on a file registration operation by a user of the information processing device; and
manage fraudulent use possibility information in association with the file, the fraudulent use possibility information indicating that there is a possibility of fraudulent use of print service using the file.

2. The print service management apparatus according to claim 1, wherein the processor is programmed to:
acquire one or a plurality of character strings for which there is a possibility of being written in a file for fraudulent use of print service, and
when the file received includes at least one of the acquired one or the plurality of character strings or a combination of the acquired one or the plurality of character strings, control registration so that a higher load than normal is imposed on the file registration operation.

3. The print service management apparatus according to claim 2, wherein the processor is programmed to
when the file received does not include any of the acquired one or the plurality of character strings or a combination of the acquired one or the plurality of character strings, control registration so that a normal case registration operation is performed by a user.

4. The print service management apparatus according to claim 1, wherein the processor is programmed to
control registration so that a higher load than normal is imposed on a user by increasing a number of input items of information or a number of registration operations.

5. The print service management apparatus according to claim 4,
wherein information inputted by a user is user information by which a registrant of the file is identifiable.

6. The print service management apparatus according to claim 1, wherein the processor is programmed to
associate information inputted by a user with the file, the information being the fraudulent use possibility information.

7. The print service management apparatus according to claim 1, wherein the processor is programmed to:
receive a print request sent from a printer; and
when a file to be printed specified in the received print request is associated with the fraudulent use possibility information, perform control to cause the printer to display a message indicating that there is a possibility of fraudulent use of print service using the file.

8. The print service management apparatus according to claim 7, wherein the processor is programmed to
when user information of a registrant of the file is associated with the fraudulent use possibility information, display the user information as the message.

9. The print service management apparatus according to claim 7, wherein the processor is programmed to disable printing of the file according to an instruction sent from the printer.

10. The print service management apparatus according to claim 9, wherein the processor is programmed to
cause recording of information on the file for which printing is disabled.

11. The print service management apparatus according to claim 1, wherein the processor is programmed to:
acquire guarantee information that defines a user or an information processing device for which it is guaranteed that print service is not fraudulently used; and
when a file is received from a user or an information processing device defined in the guarantee information, control registration so that a normal case registration operation is performed by the user or a user who uses the information processing device.

12. The print service management apparatus according to claim 1, wherein the processor is programmed to:
when there is a possibility of fraudulent use of print service using the file received, acquire user related information related to a user who performs the file registration operation, from the information processing device; and
manage the user related information in association with the file.

13. The print service management apparatus according to claim 12,
wherein the user related information is a photographed image of the user who performs the file registration operation.

14. The print service management apparatus according to claim 12,
wherein the user related information is position information on the user who performs the file registration operation.

15. A print service system comprising:
the print service management apparatus according to claim 1;
an information processing device used by a user who requests registration of a file to be printed to the print service management apparatus; and
a printer that prints the file.

16. A non-transitory computer readable medium storing a program causing a computer to execute a process, the process comprising:
receiving a file to be registered sent from an information processing device;
registering the file received in a memory and managing the file; and
when there is a possibility of fraudulent use of print service using the file received,
controlling registration so that a higher load than normal is imposed on a file registration operation by a user of the information processing device; and
managing fraudulent use possibility information in association with the file, the fraudulent use possibility information indicating that there is a possibility of fraudulent use of print service using the file.

* * * * *